United States Patent [19]

Massa

[11] 4,332,017

[45] May 25, 1982

[54] MECHANOACOUSTIC TRANSDUCER FOR USE IN TRANSMITTING HIGH ACOUSTIC POWER DENSITIES INTO GEOLOGICAL FORMATIONS SUCH AS OIL-SATURATED SANDSTONE OR SHALE

[75] Inventor: Frank Massa, Cohasset, Mass.

[73] Assignee: The Stoneleigh Trust, Cohasset, Mass. ; Fred M. Dellorfano, Jr. and Donald P. Massa, Trustees

[21] Appl. No.: 67,727

[22] Filed: Aug. 20, 1979

[51] Int. Cl.³ .............................................. H04B 11/00
[52] U.S. Cl. .................................... 367/148; 367/142; 367/153
[58] Field of Search ................ 367/142, 148, 153, 155

[56] References Cited

U.S. PATENT DOCUMENTS

| | | | |
|---|---|---|---|
| 985,524 | 2/1911 | Gray | 367/153 |
| 2,548,905 | 4/1951 | O'Denweller et al. | 367/142 |
| 2,961,636 | 11/1960 | Benecke | 367/155 |
| 3,319,735 | 5/1967 | Hayes et al. | 367/148 |
| 3,720,908 | 3/1973 | McCoy et al. | 367/148 |
| 4,107,790 | 8/1978 | McCord | 366/127 |
| 4,207,626 | 1/1980 | Wedding et al. | 367/142 |

*Primary Examiner*—Harold J. Tudor

[57] ABSTRACT

A mechanoacoustic transducer is described which comprises a plurality of circumferentially spaced contiguous vibratile plate members which are driven in phase by a rotating cylindrical cam. The cam is shaped to provide radial oscillatory displacements of the vibratile plates of sufficient amplitude to generate acoustic power density levels in liquids in the order of 100 kW or more per square foot of radiating surface of the cylindrical transducer. The transducer has a diameter of several inches, and it can be lowered into a flooded hole of such size as is usually drilled in an oil field. The mechanically-driven transducer provides an economical means for transmitting very intense low-frequency acoustic power into an oil-bearing shale or sandstone deposit for the purpose of dislodging the trapped oil and increasing the flow rate out of the sediment within which the oil is entrapped.

15 Claims, 2 Drawing Figures

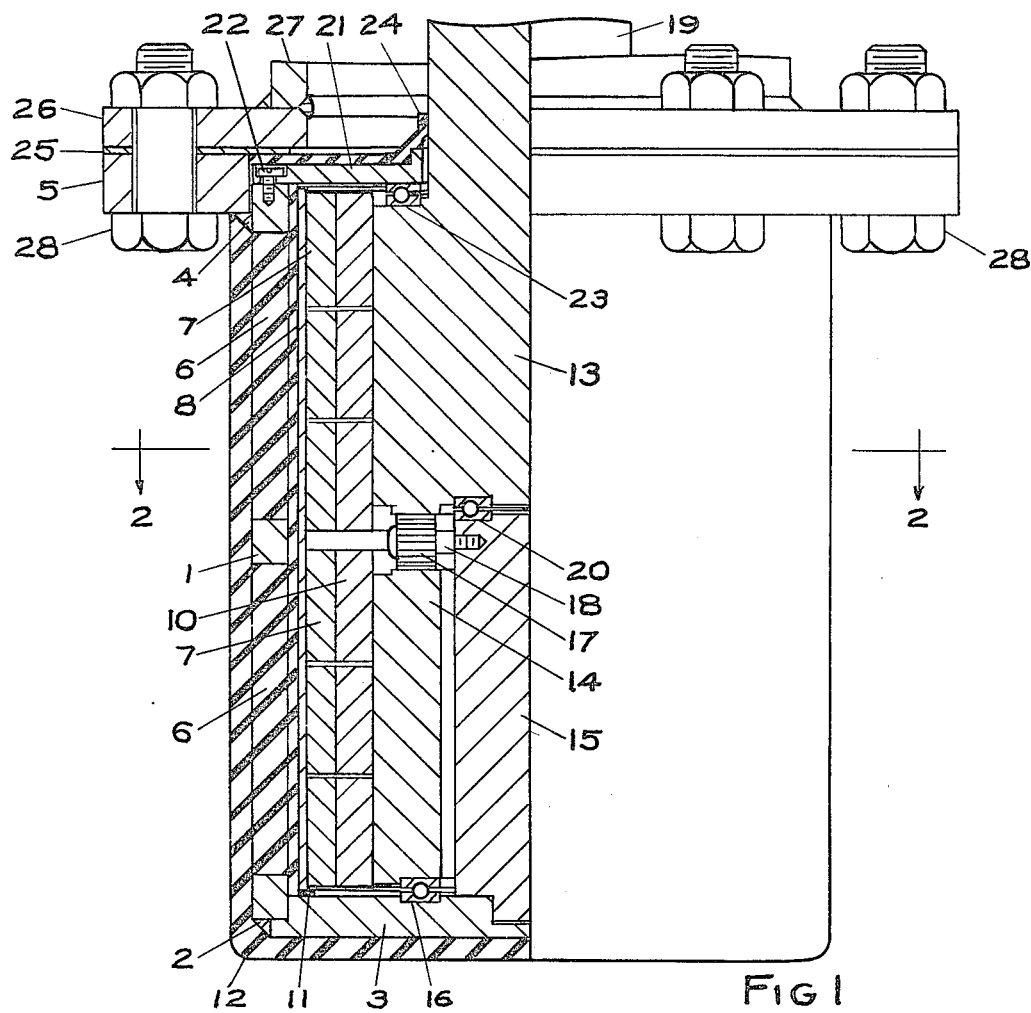
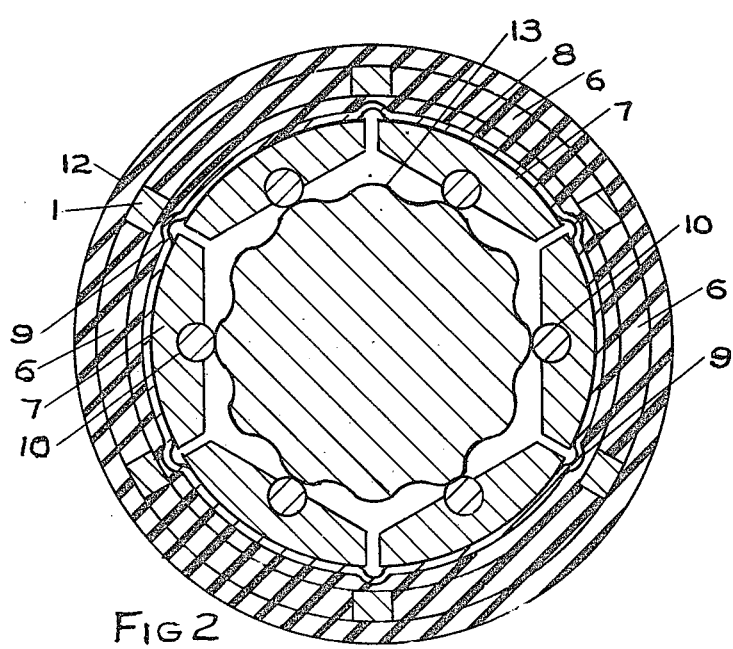

MECHANOACOUSTIC TRANSDUCER FOR USE IN TRANSMITTING HIGH ACOUSTIC POWER DENSITIES INTO GEOLOGICAL FORMATIONS SUCH AS OIL-SATURATED SANDSTONE OR SHALE

This invention is concerned with improvements in high-power low-frequency transducers for generating high acoustic power densities in excess of 100 watts per square inch of radiating surface of the transducer. The improved transducer is especially adapted for generating very high acoustic power, in the order of tens or hundreds of kilowatts, inside a flooded hole of several inches diameter, such as are typically found in oil-drilling operations. One useful application for the inventive transducer is to transmit very intense low-frequency acoustic power into an oil-bearing shale or sandstone deposit for the purpose of dislodging the trapped oil and increasing the flow rate out of the sediment within which the oil is entrapped. The improved transducer will permit the efficient transmission of very high acoustic power into a high acoustic impedance medium, such as a liquid or a solid, and provide a relatively low-cost practical means for improving large-scale mining operations, such as extracting materials from low-yield deposits. The inventive transducer may also be used in the separation and refining of ores or chemicals by the introduction of high-intensity sonic energy directly into the tanks or vats containing the materials being processed.

The primary object of my invention is to provide a transducer capable of economically generating very high acoustic power densities at low audio frequencies from a relatively small vibrating surface.

Another object of the invention is to provide a transducer that may be lowered into a relatively small diameter hole, such as are drilled into the ground for extracting oil from oil deposits.

Another object of the invention is to design a mechanoacoustic transducer adapted for generating very high acoustic power density levels in liquids in excess of 100 watts per square inch of radiating surface of the transducer.

Another object of the invention is to design a mechanoacoustic transducer adapted for generating acoustic power levels in the order of 100 kW or more per square foot of radiating surface of the vibratile surface of said transducer.

Still another object of the invention is to provide a method for employing the inventive transducer to generate acoustic power levels in the order of 100 kW or more per 1 foot axial length of transducer when the transducer is lowered into a flooded hole several inches in diameter, such as are generally drilled for the extraction of oil from oil fields.

Additional objects will become more apparent to those skilled in the art by the description of the invention which follows, when taken with the accompanying drawings in which:

FIG. 1 is a partial cross-sectional view illustrating one embodiment of my invention in which a pair of mechanically-driven cylindrical cams rotating in opposite directions produce balanced radial vibrational forces to produce radial oscillatory displacements of a sectionalized cylindrical surface whereby very high acoustic power levels can be generated by the mechanoacoustic transducer when its radiating surface is coupled to a high acoustic impedance medium, such as a liquid or a solid.

FIG. 2 is a section taken along the line 2—2 of FIG. 1 for the total transducer without the removal of the parted section in FIG. 1.

Referring more specifically to the figures, the main frame support structure of the transducer assembly comprises a rugged tubular steel member 1 which is welded at point 2 to circular plate 3, and at point 4 to a rugged flange member 5. The tubular member 1 has peripheral openings 6 cut through the wall of the tube such that the resulting structure effectively becomes a rigid frame member for supporting the transducer vibratile structure.

The sound generating vibratile structure comprises a plurality of circumferentially spaced plate members 7 which are bonded by epoxy cement or any other suitable means to the inside surface of a tubular sleeve 8. Compliant vertical rib channels 9 are formed into the surface of the tubular sleeve 8, as illustrated in FIG. 2, in order that the peripherally-spaced plate members 7 may be able to move radially at high amplitude during the operation of the transducer. A hardened steel rod 10 is forced-fit or otherwise secured within an accurately-located hole provided in each plate member 7 so that a portion of the rod surface projects beyond the flat surface of the plate member to serve as a center line drive point for imparting oscillatory radial displacements to the vibrating plates 7 during the operation of the transducer.

After fabricating the vibratile plate assembly, the structure is placed inside the tubular frame member 1 leaving a uniform clearance between the outside diameter of the sleeve member 8 and the inside diameter of the tubular member 1. It is advantageous to align the structure so that each vibratile plate member 7 is located opposite an opening 6 in the wall of the structural member 1. A small clearance is maintained between the bottom edge of the sleeve member 8 and the top surface of the base plate 3 by placing a thin rubber gasket 11 between the lower edge of the sleeve 8 and the base 3, as shown in FIG. 1. Next, a rubber-like potting compound, such as polyurethane is poured to fill all the empty spaces between the outer surface of sleeve member 8, including all the window cut-out spaces 6, and to form the outer housing 12 whose external dimensions are established by a cup-shaped cylindrical mold within which the assembly is placed before pouring the potting compound. The potting operation results in a waterproof transducer enclosure which is sufficiently flexible to permit the high radial displacement amplitudes to be transmitted from the vibratile plates 7 through the flexible transducer housing structure and into the medium within which the transducer is immersed.

The mechanical drive system for operating the transducer comprises two cylindrical cams 13 and 14, each rotated in opposite direction, with each cam driving 50% of the vibratile plate sections, thereby neutralizing the opposing rotational forces generated by each cam. The upper and lower cylindrical cams 13 and 14 both have an even number of peripheral undulations formed into their outer surfaces, as illustrated in the cross-sectional view of FIG. 2. In the illustrative example, there are six vibratile plate portions 7 shown in the assembly and the cams each have twelve undulations equally spaced around the periphery. For this illustrated example, there will be twelve complete cycles of radial displacements of the cylindrical array of vibratile plates for each revolution of the cams. It is obvious that this ratio can be changed by changing the number of undulations in the periphery of the transducer. It is preferable to employ an even number of vibratile plates and also an even number of undulations in the cam surfaces in order that the radial forces will be dynamically balanced during the operation of the transducer.

A mechanical means for establishing opposite directional rotation for the two cams 13 and 14 is illustrated by the construction shown in FIG. 1. A rigid steel post 15 is welded or brazed, or otherwise secured to the bottom plate 3, as illustrated. A ring-shaped cylindrical cam 14 is lowered into position, as shown in FIG. 1. The cam will drop in place by rotating the structure until the minimum diameter points of the cam lie opposite the cylindrical rods 10. A ball bearing 16 is used as a thrust bearing between the cam 14 and the bottom plate 3, as illustrated. An idler gear 17 is fastened to the post 15 by means of a stud 18 which acts both as a shaft and as a spacer for holding the gear in the desired position. The gear engages with mating ring gear surfaces which are formed at the mating ends of the cams 13 and 14, as illustrated in FIG. 1. The top cam 13 is shown as a solid cylindrical cam with an extension shaft portion 19 which projects from the top of the transducer, as illustrated, and serves as a drive shaft for applying the mechanical power to operate the transducer. The cam 13 is lowered into place and rests on a thrust bearing 20 which supports the cam 13 on the top surface of the structural member 15. After completing the assembly of cam 13, a retaining plate 21 is fastened by the screws 22 to the top surface of the tubular member 1, as shown. A ball bearing or roller bearing 23 is assembled between the top surface of the cam 13 and the lower surface of plate 21 to hold the cams in operative position inside the transducer housing. If necessary, shims of selected thicknesses may be placed between the mating surfaces of the tubular member 1 and the plate 21 before fastening the screws 22. The selected shims will establish the proper vertical clearance in the assembly in order that the cam shaft 19 can turn freely during the operation of the transducer.

In order to complete the final assembly of the transducer, a molded rubber gasket 24 is put in position, as shown in FIG. 1, and serves to provide a seal between the shaft 19 and the inside of the transducer to prevent the entrance of dust or other foreign substances into the transducer. A flat gasket 25 is assembled over the rubber gasket 24 and between the mating surfaces of the flange 5 and flange 26. The flange 26 is welded to a section of pipe 27. The opposite end of pipe 27 (not shown) is welded to another flange similar to flange 26. The welded pipe section with the two end flanges provides an extension member for extending the periphery of the transducer to any length desired by the use of the required number of extension sections. The flange members 5 and 26, with the intervening gasket 25, are bolted together by the bolts 28, as illustrated. The shaft 19 is also provided with extension members which can be connected one to another by the use of small diameter flanges that fit inside the pipe 27, or by any other well-known mechanical coupling device.

For operating the transducer, a source of rotational mechanical power is supplied to the drive shaft 19 while holding the outer flange member 26 fixed. The source of rotational power may be supplied from any well-known type of prime mover, such as a steam engine, internal combustion engine, jet engine, turbine, etc. By rotating the shaft 19 while the transducer flange 5 is held stationary, the vibratile plates 7 will be set into radial vibration at the amplitude determined by the dimensions of the undulations in the cam members, and if the transducer is immersed in a flooded hole, intense acoustic power will be transmitted through the liquid and into the solid ground or shale into which the hole is drilled. In order to reduce the attenuation loss which occurs when transmitting acoustic power through the ground, it is desirable to use a low audio frequency preferably below 1 kHz.

I have found that by transmitting sonic power into a porous or laminated solid structure containing entrapped liquids, the friction between the entrapped thin liquid films and the solid matrix containing it is very greatly reduced and the liquid flows easily through the pores in the presence of the acoustic excitation. The ability to generate hundreds of kilowatts of low-frequency sonic energy by the inventive mechanoacoustic transducer of relatively small diameter without the use of expensive electroacoustic drive systems, such as are required for conventional electroacoustic transducers, achieves an economic solution to the generation of very high acoustic power densities. To give some approximate indication of the enormous amounts of acoustic power that can be generated with relatively small mechanical structures, as disclosed in this invention, a calculation was made to determine the necessary amplitude of the surface of a vibrating cylinder which is required to produce approximately 100 kW of acoustic power per 1 ft. of axial length of cylinder when operating at a frequency of 600 Hz. At 600 Hz, the wavelength in water or oil is approximately 100 inches, and for a cylinder whose vibrating diameter is 4" and whose length is greater than approximately 4 ft., the radiation resistance is approximately 27,000 acoustic ohms/cm$^2$. For a 1 ft. axial length of the cylinder, the radiating area is approximately 980 cm$^2$. Assuming that the rotating cylindrical cams 13 and 14 in the inventive transducer produce a peak-to-peak displacement of 2 mm, the peak velocity of the cylindrical surface at 600 Hz is approximately 377 cm/sec. For these assumed conditions, the acoustic power generated per 1 ft. axial length of cylinder is approximately 185 kW. In order to prevent cavitation at these very high power levels, it is necessary that the medium into which the transducer is coupled is pressurized to about 10 atmospheres or more. This condition will be satisfied automatically by submerging the transducer in an oil-filled or water-filled hole to a depth of 300 ft. or more.

For other applications of the transducer, such as the generation of high acoustic power densities in tanks or in shallow holes, the required pressure to prevent cavitation in the vicinity of the transducer can be obtained by sealing the tank or shallow hole and applying hydraulic pressure to the contained liquid.

Since the inventive transducer is a constant amplitude device, the radiated power will drop off very rapidly as the frequency is reduced. The power will drop off as the square of the velocity of the cylindrical surface which, in turn, is proportional to the square of the frequency. The output power will drop off additionally by the reduction in radiation resistance caused by the reduction in diameter to wavelength ratio for the cylinder when operating at the lower frequency. The reduction in acoustic power output at the lower frequencies for the constant amplitude mechanoacoustic transducer, as disclosed, will be an advantage in the operation of the transducer because, as the prime mover starts up from rest, the mechanical power requirement will initially be very very low, and will increase rapidly with increasing frequency until the design speed is reached. This puts a very small demand on the driving power source during the initial starting of the transducer, and the power requirement will gradually increase while the transducer is coming up to speed. Another operating advantage of the inventive constant amplitude transducer is that the transducer will automatically limit the speed at which the prime mover can operate to the value dictated by the maximum horse power than can be developed by the power source.

FIGS. 1 and 2 illustrate the transducer with the use of two cams 13 and 14 rotating in opposite directions, and each cam is driving an equal number of vibratile plate sections. It is possible to increase the number of cams to 4, 6, or more, and to install idler gears between each additional pair of cams so that each added cam turns in the opposite direction to its neighbor, thereby maintaining the complete balancing of the rotational forces in the operation of the multi-section transducer. Only one idler gear 17 is shown in the partial cross-sectional view of FIG. 1. At least three idlers should be used equally spaced around the circumference of the structural member 15 so that the cams will be held stable along their vertical axes. Although the cams have been shown as having solid peripheral surfaces, the projecting portions from the peripheral surfaces could consist of cylindrical roller bearing elements, if desired, to reduce friction during operation. It is also possible to further reduce friction by substituting the fixed cylindrical pins 10 by cylindrical roller bearing elements which would provide rolling contact with the cam surface during the rotation of the cam.

While a specific embodiment of the present invention has been shown and described, it should be understood that various additional modifications and alternative constructions may be made without departing from the true spirit and scope of the invention. Therefore, the appended claims are intended to cover all such equivalent alternative constructions that fall within their true spirit and scope.

I claim:

1. In combination in a mechanoacoustic transducer, a plurality of vibratile rigid plate members, each vibratile rigid plate member characterized in that it includes an acoustic energy radiating surface area portion and a mechanically vibratile force-driven portion, compliant structural support means attached to the radiating surface area portions of said vibratile rigid plate members, said structural support means characterized in that the surface area portions of said vibratile rigid plate members are held in a prescribed array configuration, said compliant structural support means further characterized in that each one of said plurality of mounted vibratile plate members is free to vibrate as a piston when driven by an oscillatory mechanical force, a plurality of oscillatory mechanical force generating cam means, means for coupling each of said plurality of oscillatory mechanical force generating cam means to the force driven portion of each of said plurality of vibratile rigid plate members, whereby each of said plurality of vibratile rigid plate members are simultaneously vibrated synchronously and in phase with one another.

2. The invention in claim 1 characterized in that said plurality of vibratile plate members are equally spaced around the periphery of a circle.

3. The invention in claim 2 further characterized in that said acoustic radiating surface area portions and said mechanically vibratile force-driven portions of said vibratile plate members are located approximately on concentric cylindrical surfaces.

4. The invention in claim 3 characterized in that the diameter of the cylindrical array of said acoustic radiating surface area portions of said vibratile plate members is less than 1 ft., and further characterized in that the frequency of operation of the transducer is less than 1 kHz.

5. The invention in claim 3 characterized in that said plurality of oscillatory mechanical force generating means includes a cylindrical cam with a plurality of circumferentially equally spaced projections on the surface of said cam, the number of projections corresponding to the number of vibratile plate members that are equally spaced circumferentially around the periphery of a cylinder, structural support means for holding said cylindrical cam in operating relationship with said plurality of vibratile plate members, mechanical drive means for rotating said cylindrical cam whereby each separate projection from said cam surface engages simultaneously with each separate circumferentially spaced mechanically vibratile force-driven portion of said plurality of vibratile plate members thereby causing each of said vibratile plate members to be set into synchronous vibration during the rotation of said cam.

6. The invention in claim 5 characterized in that said cylindrical cam is divided into at least one pair of coaxially separated cylindrical sections, mechanical coupling means connected between said separated cylindrical cam sections, said coupling means characterized in that each one of a pair of said coaxially separated cam sections is rotated simultaneously in opposite direction from one another when said mechanical drive means is operating, and still further characterized in that each circumferentially equally spaced surface projection on each pair of coaxially separated cylindrical cam sections simultaneously engages an equal number of circumferentially equally spaced vibratile plate members whereby the rotational forces created by the oppositely rotating cam sections are balanced.

7. The invention in claim 5 characterized in that the diameter of the cylindrical array of said radiating surface area portions of said vibratile elements is less than 1 ft., and further characterized in that the frequency of operation of the transducer is less than 1 kHz.

8. The invention in claim 6 characterized in that the diameter of the cylindrical array of said radiating surface area portions of said vibratile elements is less than 1 ft., and further characterized in that the frequency of operation of the transducer is less than 1 kHz.

9. The invention in claim 6 characterized in that said plurality of vibratile plate members are even in number and are mounted in diametrically opposed pairs.

10. The invention in claim 8 characterized in that said plurality of vibratile plate members are even in number and are mounted in diametrically opposed pairs.

11. In combination in a mechanoacoustic transducer, a plurality of an even number of contiguous vibratile mechanical elements, each vibratile element including an acoustic energy radiating surface area portion and a mechanically vibratile force driven portion, structural support means for mounting said vibratile mechanical elements in a cylindrical array configuration, said structural support means characterized in that each mounted vibratile mechanical element is free to be displaced radially from its stationary position in the cylindrical array by the application of an oscillatory mechanical force to drive said vibratile mechanical elements, a first and a second cylindrical cam, each cam characterized in that it has the same even number of longitudinal projections around the outer cylindrical surface of the cam which result in the generation of oscillatory mechanical forces as each successive longitudinal projection deflects said vibratile mechanical elements during the rotation of said cams, said first cam characterized in that a drive shaft is rigidly attached to said cam concentrically with the cylindrical axis of said first cam, said second cam characterized in that it is mounted coaxially with said first cam and displaced longitudinally from said first cam, said first and said second cam further characterized in that the displaced facing end surfaces of said first and said second cams are each provided with an identical ring gear, a plurality of idler gears, mounting means for said plurality of idler gears, said mounting means characterized in that said idler gears are located in normal driving relationship between said two identical ring gears, whereby when said drive shaft is rotated, said second cam is driven in opposite direction to the rotation of said first cam, thus balancing the rotational components of the forces generated by the rotating cams and also balancing the radial forces by the simultaneous deflections by said cams of diametrically opposed pairs of the even number of vibratile mechanical elements assembled in the cylindrical array.

12. The invention in claim 11 characterized in that the diameter of the assembled cylindrical array of vibratile mechanical elements is less than 1 ft.

13. The invention in claim 12 characterized in that the frequency of operation of said transducer is less than 1 kHz.

14. The invention in claim 13 characterized in that the acoustic power generated by said transducer when submerged in a liquid such as water or oil is greater than 100 watts/sq.in. of vibratile surface area, provided the liquid is under sufficient hydrostatic pressure to prevent cavitation.

15. The invention in claim 14 characterized in that the acoustic power generated by said transducer is approximately 100 kW or greater per linear ft. of the vibratile portion of said cylindrical array.

* * * * *